No. 752,990. Patented February 23, 1904.

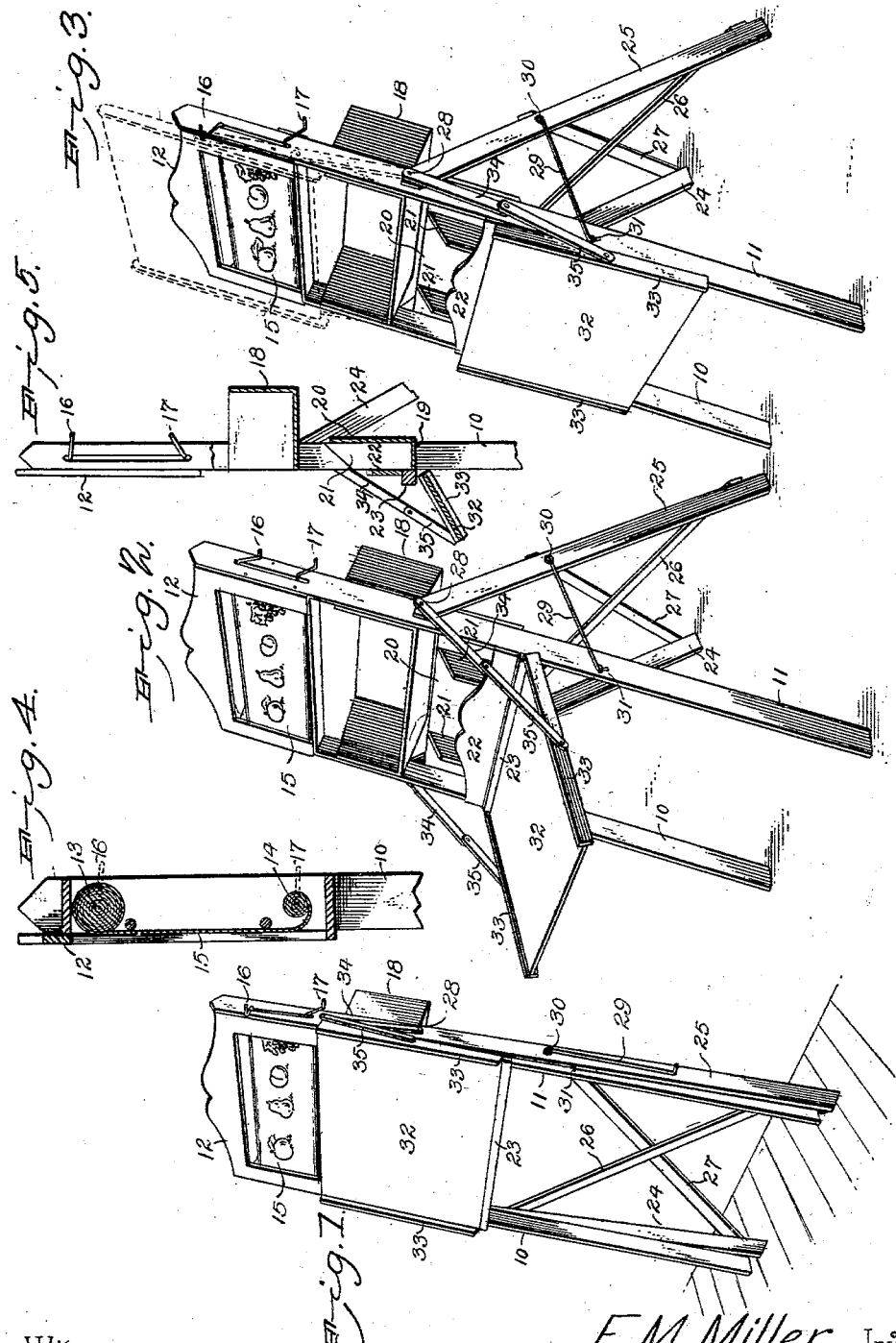

UNITED STATES PATENT OFFICE.

EDWARD M. MILLER, OF ADRIAN, OHIO.

COMBINATION DESK, BOOK-RACK, AND EASEL.

SPECIFICATION forming part of Letters Patent No. 752,990, dated February 23, 1904.

Application filed September 25, 1902. Serial No. 124,817. (No model.)

*To all whom it may concern:*

Be it known that I, EDWARD M. MILLER, a citizen of the United States, residing at Adrian, in the county of Seneca and State of Ohio, have invented a new and useful Combination Desk, Book-Rack, and Easel, of which the following is a specification.

This invention relates to a combined desk, blackboard, book-rack, and supporting-easel, and has for its object the production of a simple device, compact in construction, capable of adjustment for the use of persons varying in height, and of being folded into a small space for transportation or storage or extended for use; and the invention consists in certain novel features of construction, as hereinafter shown and described, and specified in the claim.

In the drawings illustrative of the invention, Figure 1 is a perspective view of the device folded for transportation or storage. Fig. 2 is a perspective view of the device extended for use as a desk. Fig. 3 is a perspective view of the device extended for use as a blackboard. Fig. 4 is an enlarged sectional detail of the scroll or belt mechanism. Fig. 5 is a sectional detail illustrating the construction of the combined blackboard and desk member supporting means.

The device consists in a supporting-frame formed of longitudinal side members 10 11, connected at the top by a transverse frame 12 and with spaced rollers 13 14 between the side members within the frame 12, the rollers connected by a belt or scroll 15. The belt or scroll 15 is connected by its ends, respectively, to the rollers and the rollers provided outside the frame with cranks 16 17, whereby they may be rotated. By this means it will be obvious by revolving the rolls forward and backward the belt or scroll may be wound alternately from one roller to the other.

The belt or scroll will be provided with any desired representations of objects, preferably with objects which it is desired the pupil shall copy upon the blackboard, and these objects may be varied as required. They may be animals, figures, letters, sentences, or words, geometrical or arithmetical problems, or other desired educational, instructive, or amusing matter, and I do not, therefore, wish to be limited in any manner to the matter exhibited upon the scroll or belt.

Beneath the scroll-frame between the sides 10 and 11 is an inclosed shelf 18, adapted to support books or other objects, and beneath this shelf 18 is another, preferably narrower, shelf, 19, having a back 20 and provided with one or more vertical partitions 21 and a front member 22, transversely disposed across the side members and forming a partial closure to the pockets formed by the partitions 21, as indicated.

The front 22 will project beyond the side members 10 11 and will preferably be provided at its lower end with a rib 23, forming a greater projection transversely across the side members 10 11 intermediately of their height.

Pivotally supported by their upper ends to the side members 10 11 are brace or leg members 24 25, foldable into alinement with the side members when not in use, as illustrated in Fig. 1, and suitably supported by diagonal braces 26 27. The pivots by which the leg members are connected to the side members are indicated at 28, one only being shown; but it will be understood that each of the leg members will be provided with its independent pivot.

The leg members are provided with braces 29, pivotally engaged at one end at 30 thereto and adapted to engage staples 31 upon the side members, by which means the leg members are supported in their opened position. It will be understood, of course, that two of the braces 29 are employed, one for each leg member.

The combined desk and blackboard portion of the device illustrated in the drawings consists of a body portion 32, having cleats or extended strips upon the edges and uniform in length with the width of the frame, as shown. The body portion 32 is provided with a blackboard or other drawing-surface upon one side, while the other side is adapted to be employed as a writing-desk and may be covered with felt, enameled cloth, or with a varnished or polished wood surface, as may be preferred.

The combined desk and blackboard member is supported movably from the frame members 10 11 by jointed rods, each formed in two portions 34 35, the portions 34 preferably connected, respectively, to the pivot members 28 of the legs 24 25 and the portions 35 pivotally connected to the centers of the side strips 33, as shown.

It will be noted that the combined desk and blackboard member is connected to the framework only by the jointed rods 34 35, so that it is free to be folded against the framework with its lower edge resting upon the projecting rib 23, as shown in Fig. 1, elevated to a point opposite the scroll member 15, as indicated in Fig. 3, folded downward to a point comparatively near the bottom of the framework, as indicated in Fig. 3, or arranged with one edge beneath the rib 23, and thereby supported in coaction with the jointed rods 34 35 in a position at an angle to the framework and convenient to be employed as a writing-desk, as indicated in Fig. 2. Thus it will be seen that the member 32 may be readily reversed to expose its blackboard-surface for use and may with this surface exposed be moved to and sustained in a position at the top of the framework for the use of grown people or in an intermediate position resting upon the rib 23 for the use of children of a larger size and in its lowest position for the use of very small children. In either of its two latter positions the figures on the scroll will be properly exposed to admit of them being copied onto the board.

From the foregoing description it will be seen that I produce a device readily adaptable for use as a desk, blackboard, or easel and one which when employed as a blackboard may be readily adjusted for persons varying in height and in which the member 32 may when the device is not in use be folded to a position to protect books or other articles contained in the receptacle 18 and, further, one which may be conveniently set up for use in any desired place or in which the leg members may be readily folded to admit of the device being supported against the wall or stored or packed for shipment. In attaining these ends I do not limit myself to the precise details herein shown and described, as various minor changes may be made therein without departing from the spirit of my invention.

Having thus described the invention, what is claimed is—

In a device of the class described, the combination with a supporting-frame comprising side bars and pivoted leg members, of braces pivoted to the leg members and detachably engaging the side bars, a shelf inclosed at its rear and ends and sustained by the side bars and projecting beyond the same to form a transverse rib, a blackboard, and devices movably connecting the blackboard to the frame, said devices each comprising a pair of links having their inner ends pivotally connected and their outer ends pivoted respectively to the board and the frame and constituting the sole connection between the parts and permitting free adjustment of the board to a position at the top of the frame, at the bottom of the frame, or an intermediate position over and resting upon the transverse rib and forming a front closure for the shelf.

In testimony that I claim the foregoing as my own I have hereto affixed my signature in the presence of two witnesses.

EDWARD M. MILLER.

Witnesses:
LOUIS ETCHEN,
WM. HAINES.